United States Patent
Matsubara et al.

(10) Patent No.: US 7,895,904 B2
(45) Date of Patent: Mar. 1, 2011

(54) MULTI-VORTEX FLOWMETER EMPLOYING VOLUME FLOW RATE AS SWITCHING POINT

(75) Inventors: Naoki Matsubara, Tokyo (JP); Kohji Takahashi, Tokyo (JP)

(73) Assignee: Oval Corporation, Tokyo (JP)

( * ) Notice: Subject to any disclaimer, the term of this patent is extended or adjusted under 35 U.S.C. 154(b) by 61 days.

(21) Appl. No.: 12/225,584

(22) PCT Filed: Apr. 23, 2007

(86) PCT No.: PCT/JP2007/059280
§ 371 (c)(1),
(2), (4) Date: Sep. 25, 2008

(87) PCT Pub. No.: WO2007/145036
PCT Pub. Date: Dec. 21, 2007

(65) Prior Publication Data
US 2009/0241687 A1    Oct. 1, 2009

(30) Foreign Application Priority Data
Jun. 13, 2006  (JP) ............................. 2006-163340
Jun. 13, 2006  (JP) ............................. 2006-163343

(51) Int. Cl.
*G01F 1/32*    (2006.01)
*G01F 1/68*    (2006.01)
(52) U.S. Cl. ................. 73/861.22; 73/204.21
(58) Field of Classification Search ........... None
See application file for complete search history.

(56) References Cited
U.S. PATENT DOCUMENTS

| | | | | |
|---|---|---|---|---|
| 4,142,407 A | * | 3/1979 | Kuroiwa et al. | 73/114.35 |
| 4,565,098 A | * | 1/1986 | Herzl | 73/861.22 |
| 5,419,189 A | * | 5/1995 | Lew et al. | 73/195 |
| 6,895,813 B2 | * | 5/2005 | Mattar | 73/197 |
| 7,614,297 B2 | * | 11/2009 | Matsubara | 73/204.19 |

FOREIGN PATENT DOCUMENTS

JP    6-34417    2/1994

(Continued)

OTHER PUBLICATIONS

International Search Report mailed Jul. 3, 2007 for International Application No. PCT/JP2007/059280.

*Primary Examiner*—Harshad Patel
(74) *Attorney, Agent, or Firm*—Wenderoth, Lind & Ponack, L.L.P.

(57) ABSTRACT

A multi-vortex flowmeter includes a vortex flowmeter for measurement by volume flow rate and a thermal flowmeter for measurement by mass flow rate to selectively use the two flowmeters according to the flow rate of fluid to be measured flowing through a flow channel. The multi-vortex flowmeter has a switching point between two flowmeters based on the mass flow rate. A mass flow rate Qm at the switching point in a range larger than the minimum flow rate of a vortex flowmeter and smaller than the maximum flow rate of a thermal flowmeter is determined by: $Qm=K3*\sqrt{P}$. Alternatively, a volume flow rate Q at the switching point in a range larger than the minimum flow rate of a vortex flowmeter and smaller than the maximum flow rate of a thermal flowmeter is determined by: $Q=K1/\sqrt{P}$.

4 Claims, 8 Drawing Sheets

FOREIGN PATENT DOCUMENTS

| | | |
|---|---|---|
| JP | 7-209042 | 8/1995 |
| JP | 7-225141 | 8/1995 |
| JP | 2869054 | 12/1998 |
| JP | 11-281422 | 10/1999 |
| JP | 3119782 | 10/2000 |
| JP | 2004-12220 | 1/2004 |
| JP | 2006-29966 | 2/2006 |
| JP | 2007057452 A * | 3/2007 |

* cited by examiner (a)

(b)

MULTI-VORTEX FLOWMETER EMPLOYING VOLUME FLOW RATE AS SWITCHING POINT

TECHNICAL FIELD

The present invention relates to a multi-vortex flowmeter including a vortex flowmeter for measurement by a volume flow rate and a thermal flowmeter for measurement by a mass flow rate, which uses the two flowmeters selectively depending on a flow rate of a fluid to be measured flowing through a flow channel, in particular, to a switching point between the two flowmeters.

BACKGROUND ART

In order to measure a flow rate of a fluid to be measured flowing through a flow tube, a vortex flowmeter and a thermal flowmeter are used.

As is generally known, the vortex flowmeter makes use of the fact that the number of Karman vortexes (vortex frequency) generated by a vortex generator in a unit time is proportional to a flow rate within a predetermined Reynolds number range regardless of whether the vortex generator is a gas or a liquid when the vortex generator is placed in a fluid flow. The constant of proportionality is referred to as the Strouhal number. As vortex detectors, a thermal sensor, a strain sensor, an optical sensor, a pressure sensor, an ultrasonic sensor and the like are given. The above vortex detectors can detect a thermal change, a change in lift or the like caused by the vortexes. The vortex flowmeter is a simple flowmeter capable of measuring a flow rate without being affected by physical properties of the fluid to be measured, and is widely used for flow rate measurement of gases or fluids (for example, see Japanese Patent No. 2869054).

The thermal flowmeter includes a temperature sensor (fluid temperature detecting sensor) and a heating temperature sensor (heating-side temperature sensor). A temperature of the heating temperature sensor (flow velocity sensor (heater)) having a function of a temperature sensor and a function of a heating sensor is controlled to have a constant difference in temperature with respect to a temperature measured by the temperature sensor. This is because a heat quantity, which is removed from a heater when the fluid to be measured is caused to flow, is correlated with a mass flow rate. The mass flow rate is calculated from electric power for heating the heater (for example, see Japanese Patent Application Laid-open No. 2004-12220).

Japanese Patent Application Laid-open No. 2006-29966 discloses a technology of a multi-vortex flowmeter including both the function of the vortex flowmeter and the function of the thermal flowmeter. The multi-vortex flowmeter is capable of measuring a flow rate ranging from an extremely low flow rate to a high flow rate with good accuracy, and is particularly superior to the other flowmeters in this point.

The multi-vortex flowmeter can selectively use the function of the vortex flowmeter and that of the thermal flowmeter according to the condition of a flow of the fluid to be measured flowing through a flow channel of a flow tube. Specifically, the function of the thermal flowmeter is used to perform a measurement in an extremely low flow rate region and a low flow rate region, whereas the function of the vortex flowmeter is used to perform a measurement in a high flow rate region.

Since a sensitivity of the vortex detector is insufficient in the vortex flowmeter when the flow rate is lowered to reduce a vortex differential pressure, control is performed to switch the function to that of the thermal flowmeter at a predetermined lower limit flow rate in the multi-vortex flowmeter.

In the conventional multi-vortex flowmeters, the control is performed to determine switching between the function of the vortex flowmeter and that of the thermal flowmeter based on the flow rate. Specifically, in the conventional multi-vortex flowmeters, the control is performed to effect the switching at a given flow rate. The inventor of the present application believes a problem lies in that a pressure in the flow tube is not taken into consideration at all. Hereinafter, the problem is described referring to the drawings.

The inventor of the present application has found that the lower limit flow rate serving as a criterion of determination for switching between the functions of the flowmeters can be lowered based on the fact that the vortex differential pressure increases when the pressure in the flow tube increases even at the low flow rate. The inventor of the present application intends to reflect the thus found result in the multi-vortex flowmeter. In order to make use of the advantage of the vortex flowmeter, the inventor of the present application intends to measure the flow rate by using the function of the vortex flowmeter as much as possible.

In FIG. 7($a$), on a graph showing a volume flow rate [L/min] on an axis of ordinate and a pressure in the flow tube [Mpaabs] on an axis of abscissa, the minimum flow rate of the vortex flowmeter (alternate long and short dash line) is represented by a curve. This graph shows that the vortex flowmeter can measure a lower flow rate as the pressure in the flow tube increases. This is because the vortex differential pressure increases as the pressure in the flow tube increases even at the low flow rate, resulting in a stabilized vortex signal. This fact has been found by the inventor of the present application.

Meanwhile, the switching is performed at a given flow rate in the conventional multi-vortex flowmeters as described above. Therefore, when switching points are plotted on the graph, the switching point is obtained as represented by a horizontal thick solid straight line in FIG. 7($b$) (it is natural that the switching points are plotted above the curve of the minimum flow rate (alternate long and short dash line) of the vortex flowmeter).

Next, the thermal flowmeter which satisfies the switching point (thick solid line) and the minimum flow rate (alternate long and short dash line) of the vortex flowmeter as illustrated in FIG. 7($b$) is considered. For the selection of the thermal flowmeter, the thermal flowmeter having the maximum flow rate as represented by a curve (short broken line) in FIG. 6($a$) which is plotted above the curve of the minimum flow rate (alternate long and short dash line) of the vortex flowmeter and does not cross the switching point (thick solid line) should be selected.

However, although the thermal flowmeter having the maximum flow rate as represented by the curve (short broken line) in FIG. 8($a$) has a large flow rate measurement range, the thermal flowmeter retains the possibility of failing to provide sufficient accuracy in the extremely low flow rate region or the low flow rate region, which is necessary as the multi-vortex flowmeter.

At present, there are a large number of thermal flowmeters with good accuracy. The inventor of the present application believes that an improved multi-vortex flowmeter can be provided by selecting the thermal flowmeter having the curve of the maximum flow rate closer to the curve of the minimum flow rate (alternate long and short dash line) of the vortex flowmeter from the large number of thermal flowmeters. When the thermal flowmeter with good accuracy is selected, however, a curve of the maximum flow rate (long broken line)

crosses the switching point (thick solid line) in the middle as shown in FIG. 8(b). As a result, a measurement impossible state is generated.

The inventor of the present application considers as follows. Specifically, the switching point which is not in consideration of the pressure in the flow tube is a factor which prevents the use of the thermal flowmeter with good accuracy. The inventor of the present application intends to use the thermal flowmeter with good accuracy to provide an improved multi-vortex flowmeter.

Moreover, the inventor of the present application has found the fact that the vortex differential pressure increases when the pressure in the flow tube increases even at the low flow rate and therefore the lower flow rate serving as the criterion of determination for switching the functions of the flowmeters can be lowered, and intends to reflect the thus found result in the multi-vortex flowmeter. The inventor of the present application intends to use the function of the vortex flowmeter to measure the flow rate as much as possible in order to make use of the advantage of the vortex flowmeter.

SUMMARY OF THE INVENTION

The present invention is devised in view of the above-mentioned circumstances and has an object of providing an improved multi-vortex flowmeter by using a mass flow rate for a switching point.

The present invention is also devised in view of the above-mentioned circumstances and has another object of providing a multi-vortex flowmeter which enables the switching point to be revised to enable the use of a thermal flowmeter with good accuracy.

A multi-vortex flowmeter using a mass flow rate for a switching point, which has been made in order to solve the above-mentioned problems, includes a vortex flowmeter for measurement by a volume flow rate and a thermal flowmeter for measurement by the mass flow rate to selectively use the two flowmeters according to a flow rate of a fluid to be measured flowing through a flow channel. The switching point between the two flowmeters is based on the mass flow rate, and a mass flow rate Qm at the switching point in a range larger than a minimum flow rate of the vortex flowmeter and smaller than a maximum flow rate of the thermal flowmeter is determined by: $Qm=K3\ P$ (where P is a pressure of the flow channel (variable), K3 is a constant determined by an area of the flow channel, a vortex differential pressure, a constant related to the vortex differential pressure, a density at 0.degree. C. and 1 atm, and a pressure at 1 atm).

An alternate embodiment of the multi-vortex flowmeter using a mass flow rate for a switching point, which has been made in order to solve the above-mentioned problems, includes a vortex flowmeter for measurement by a volume flow rate and a thermal flowmeter for measurement by the mass flow rate to selectively use the two flowmeters according to a flow rate of a fluid to be measured flowing through a flow channel. The switching point between the two flowmeters is based on the mass flow rate, and a mass flow rate Qm at the switching point in a range larger than a minimum flow rate of the vortex flowmeter and smaller than a maximum flow rate of the thermal flowmeter is determined by: $Qm=K4*(P/T)$ (where P is a pressure of the flow channel (variable), T is an absolute temperature of the fluid to be measured (variable), K4 is a constant determined by an area of the flow channel, a vortex differential pressure, a constant related to the vortex differential pressure, a density at 0.degree. C. and 1 atm, a pressure at 1 atm, and an absolute temperature corresponding to 0.degree. C. (273.15K)).

Another alternate embodiment of the multi-vortex flowmeter using a volume flow rate for a switching point, which has been made in order to solve the above-mentioned problems, includes a vortex flowmeter for measurement by a volume flow rate and a thermal flowmeter for measurement by the mass flow rate to selectively use the two flowmeters according to a flow rate of a fluid to be measured flowing through a flow channel. The switching point between the two flowmeters is based on the volume flow rate, and a volume flow rate Qm at the switching point in a range larger than a minimum flow rate of the vortex flowmeter and smaller than a maximum flow rate of the thermal flowmeter is determined by: $Q=K1/P$ (where P is a pressure of the flow channel (variable), K1 is a constant determined by an area of the flow channel, a vortex differential pressure, a constant related to the vortex differential pressure, a density at 0.degree. C. and 1 atm, and a pressure at 1 atm).

Another alternate embodiment of the multi-vortex flowmeter using a volume flow rate for a switching point, which has been made in order to solve the above-mentioned problems, includes a vortex flowmeter for measurement by a volume flow rate and a thermal flowmeter for measurement by the mass flow rate to selectively use the two flowmeters according to a flow rate of a fluid to be measured flowing through a flow channel. The switching point between the two flowmeters is based on the volume flow rate, and a volume flow rate Q at the switching point in a range larger than a minimum flow rate of the vortex flowmeter and smaller than a maximum flow rate of the thermal flowmeter is determined by: $Q=K2/(P/T)$ (where P is a pressure of the flow channel (variable), T is an absolute temperature of the fluid to be measured (variable), K2 is a constant determined by an area of the flow channel, a vortex differential pressure, a constant related to the vortex differential pressure, a density at 0.degree. C. and 1 atm, a pressure at 1 atm, and an absolute temperature corresponding to 0.degree. C. (273.15K)).

According to the inventions in the first two embodiments having the above-mentioned characteristics, the switching from the function of the vortex flowmeter to that of the thermal flowmeter or from the function of the thermal flowmeter to that of the vortex flowmeter is performed in consideration of the pressure or of both the pressure and the temperature. The present invention focuses attention on the fact that a higher pressure increases the vortex differential pressure to enhance the sensitivity of the vortex flowmeter to enable the measurement of a lower flow rate. By determining the switching point as in the present invention, the flowmeters can be switched based on an optimal (lowest possible) flow rate (flow velocity) even when the pressure and the temperature fluctuate.

Moreover, according to the inventions in the third and fourth embodiments having the above-mentioned characteristics, the switching from the function of the vortex flowmeter to that of the thermal flowmeter or from the function of the thermal flowmeter to that of the vortex flowmeter is performed in consideration of the pressure or of both the pressure and the temperature. According to the present invention, the switching point varies according to the pressure (the pressure and the temperature) related with the minimum flow rate of the vortex flowmeter. Therefore, the thermal flowmeter with good accuracy having the curve of the maximum flow rate close to the curve of the minimum flow rate of the vortex flowmeter can be used.

Therefore, according to the inventions in the first two embodiments, the effects of allowing provision of the multi-vortex flowmeter with good accuracy, which makes use of the advantage of the vortex flowmeter, can be obtained. Therefore, the effects of providing the multi-vortex flowmeter better than the conventional ones can be obtained.

Moreover, according to the inventions in the third and fourth embodiments, the switching point is revised to enable the use of the thermal flowmeter with good accuracy. Therefore, the effects of providing the multi-vortex flowmeter remarkably superior to the conventional ones can be obtained.

DETAILED DESCRIPTION OF THE INVENTION

Figure 1:
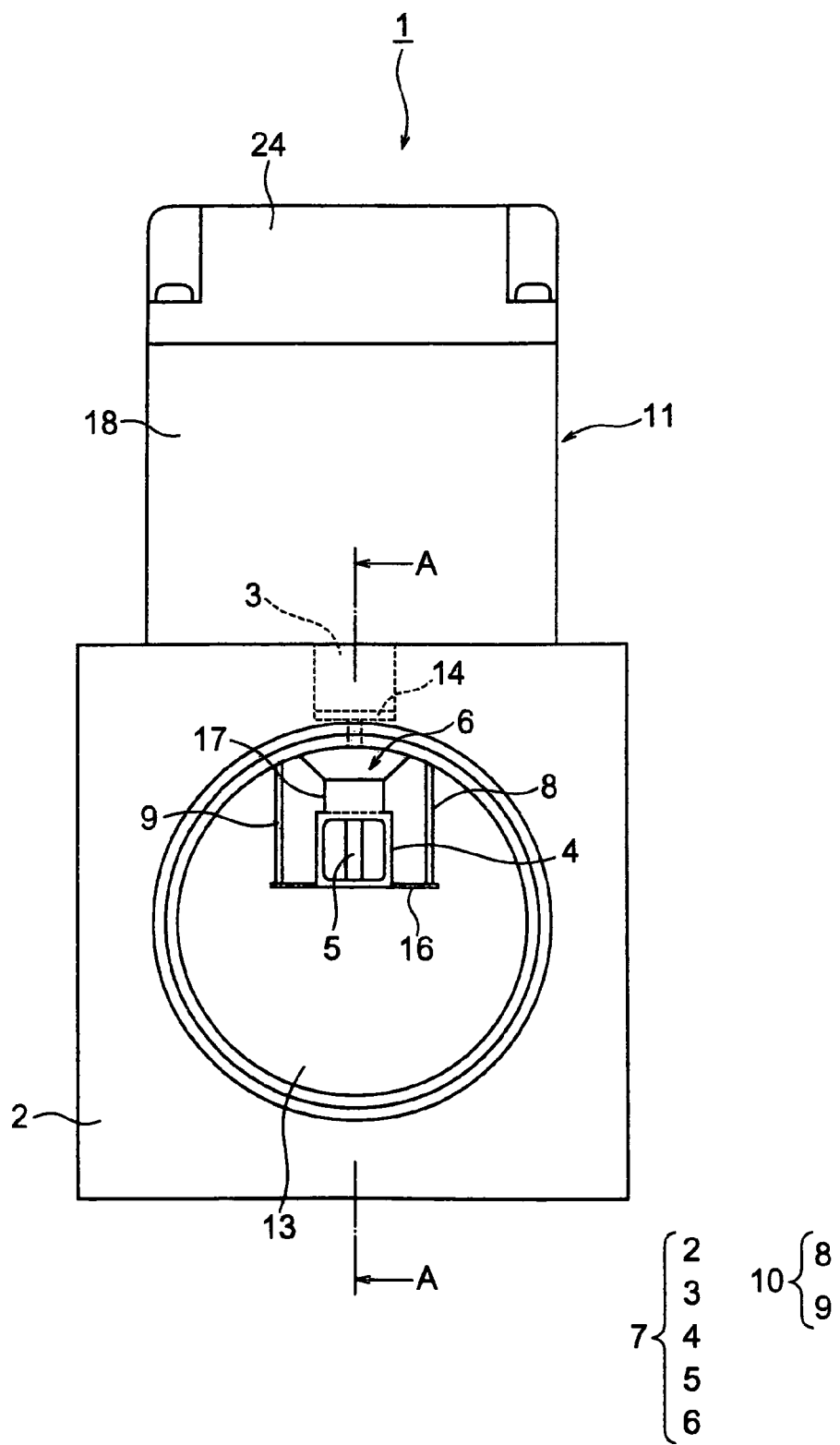
FIG. 1 is a front view illustrating an embodiment of a multi-vortex flowmeter using a mass flowrate or a volume flowrate for a switching point according to the present invention.
Figure 2:
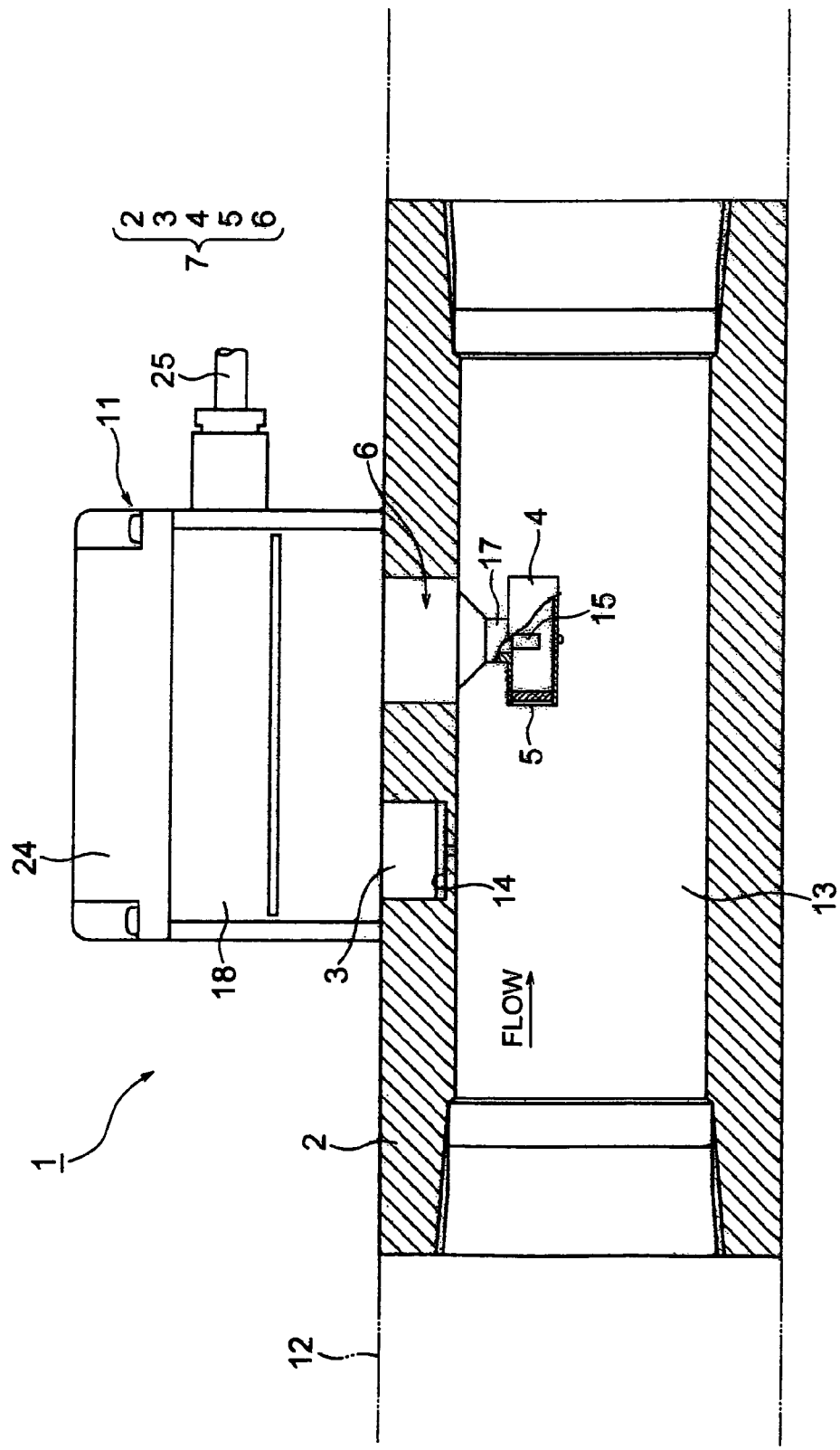
FIG. 2 is a sectional view taken along a line A-A in FIG. 1.
Figure 3:
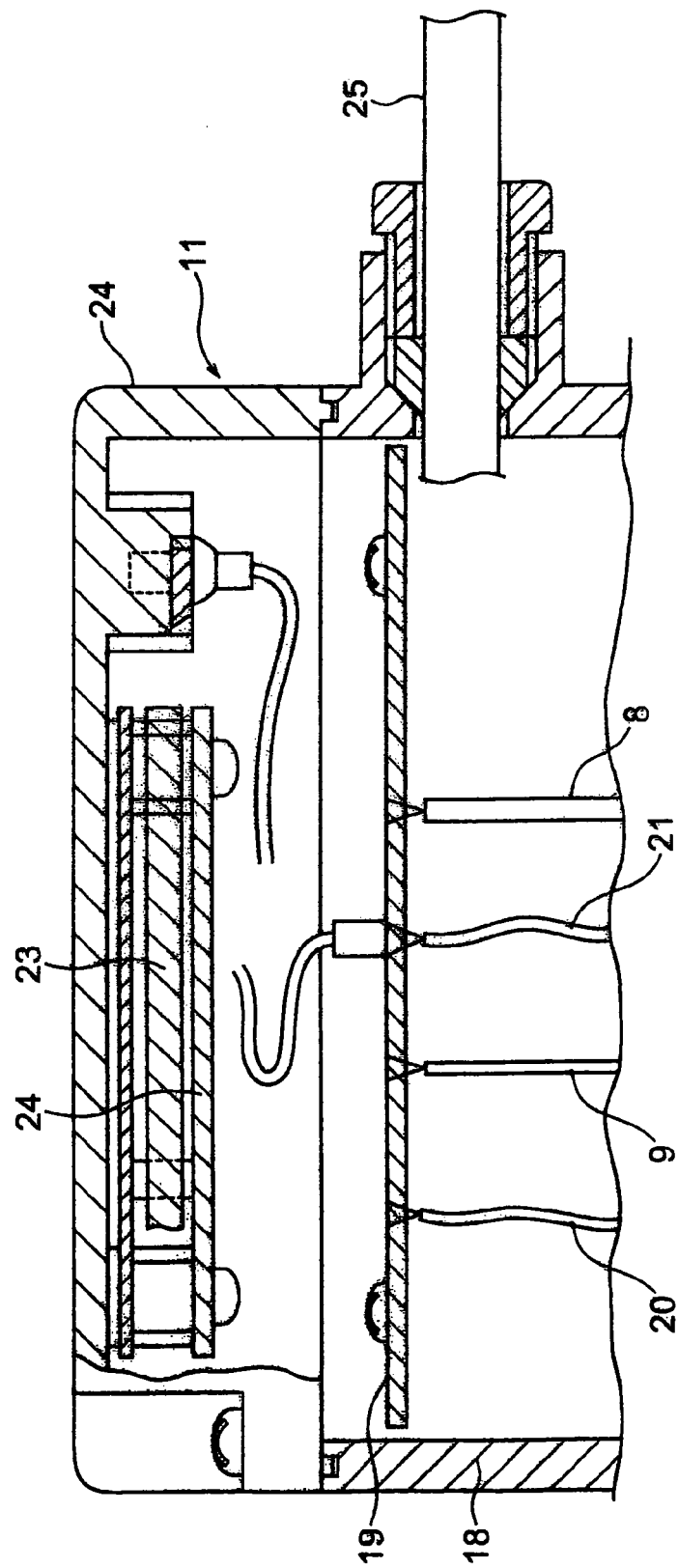
FIG. 3 is a sectional view of a flow rate converter.
Figure 4:
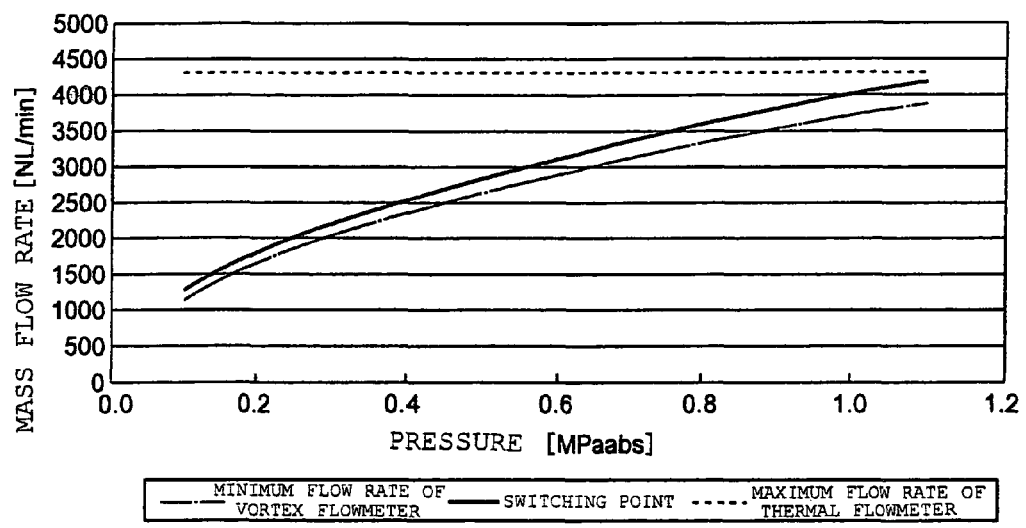
FIG. 4 is a view for illustrating a switching point.
Figure 5:
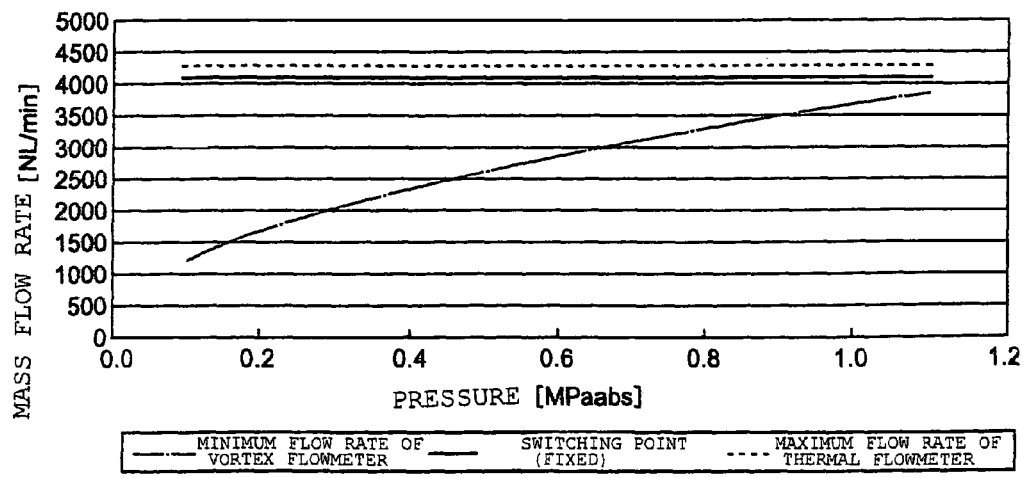
FIG. 5 is a view for illustrating the switching point.
Figure 6:
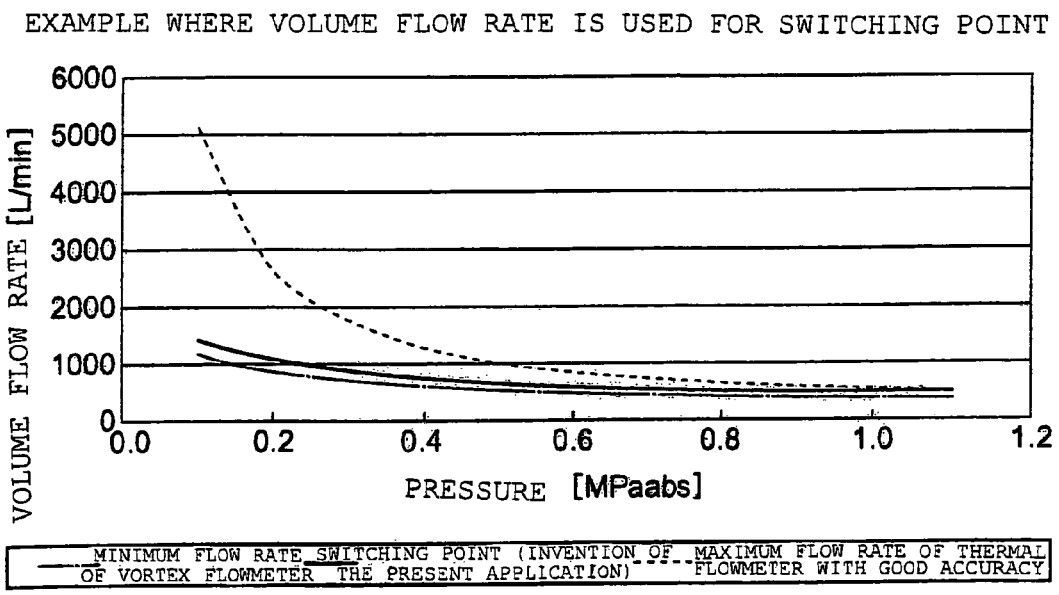
FIG. 6 is a view for comparison of the switching point.
Figure 7:
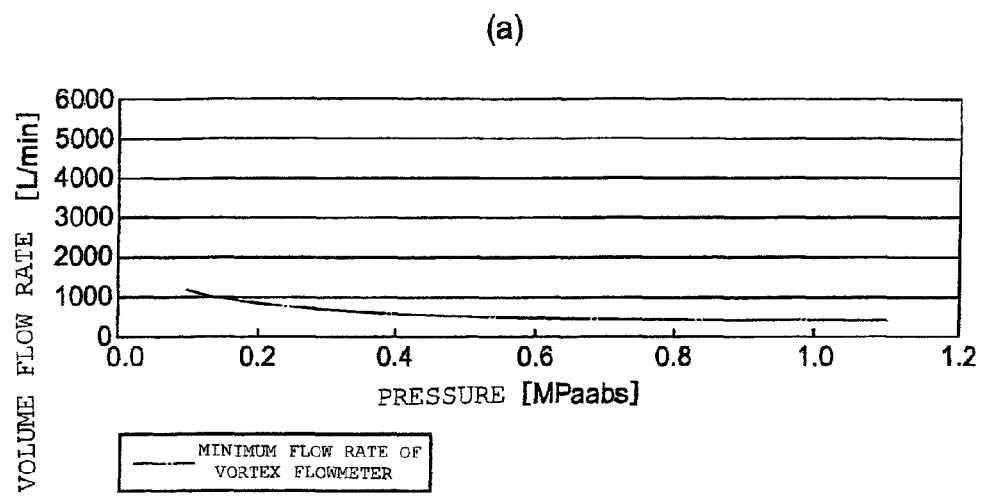
FIG. 7 is a view for illustrating a conventional switching point.
Figure 7:
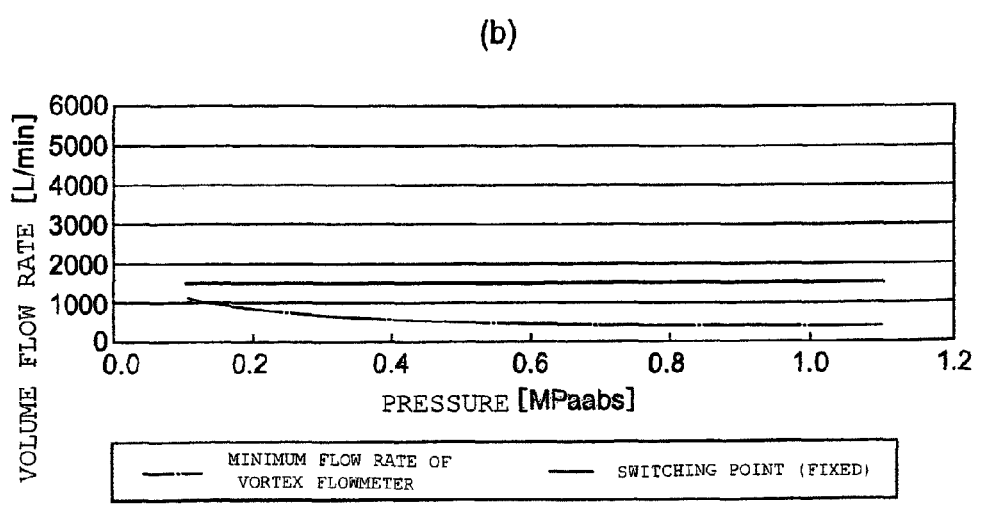
Figure 8:
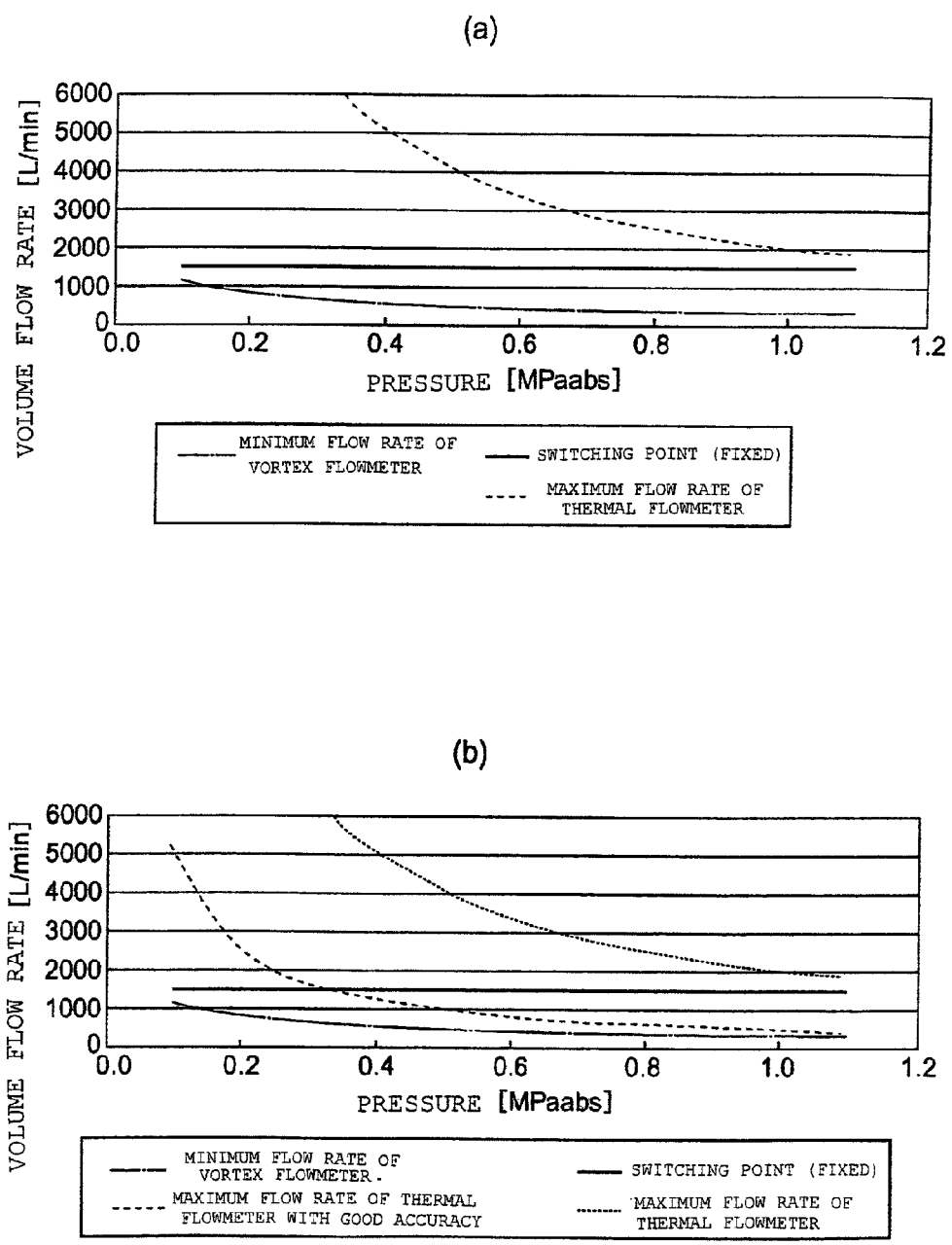
FIG. 8 is a view for illustrating the conventional switching point.

Hereinafter, a description is given referring to the accompanying drawings. FIG. 1 is a front view illustrating an embodiment of a multi-vortex flowmeter using a mass flow rate for a switching point according to the present invention. FIG. 2 is a sectional view taken along a line A-A in FIG. 1, and FIG. 3 is a sectional view of a flow rate converter. Furthermore, FIG. 4 is a view for illustrating the switching point, FIG. 5 is a view for comparison of the switching point, and FIG. 6 is a view for illustrating the switching point.

In FIGS. 1 and 2, the reference numeral 1 denotes a multi-vortex flowmeter according to the present invention. The multi-vortex flowmeter 1 is configured to have both a function of a vortex flowmeter and a function of a thermal flowmeter. Moreover, the multi-vortex flowmeter 1 is also configured to determine a switching point between the two flowmeters and to switch between the functions of the flowmeters based on the thus determined switching point. The multi-vortex flowmeter 1 includes vortex type detection device 7 having an attached measurement pipe 2, a pressure gauge 3, a measurement tube 4, a vortex generator 5 and a vortex detector 6, a thermal type detection device 10 having a temperature sensor 8 and a heating temperature sensor 9, and a flow rate converter 11 for calculating a flow velocity or a flow rate of a fluid to be measured (illustration omitted) based on output signals from the vortex type detection device 7 and the thermal type detection device 10. Hereinafter, each of the configurations is first described referring to FIGS. 1 through 3, and then, a switching point between the two flowmeters is described.

The attached measurement pipe 2 is removably attached in the middle of a flow tube 12 (the position of attachment is not limited to the middle of the flow tube 12, but can also be an end thereof), and is formed as, for example, a cylindrical structure as illustrated, which forms a flow channel 13 therein. A joint is formed on each of the ends of the attached measurement pipe 2. On an outer part of the attached measurement pipe 2 as described above, the flow rate converter 11 is fixed by appropriate means. The flow channel 13 formed in the attached measurement pipe 2 is formed to have a circular cross section. Through the flow channel 13, a fluid to be measured flows in a direction indicated by an arrow.

In the middle of the flow channel 13, the measurement tube 4, the temperature sensor 8, and the heating temperature sensor 9 are provided. At the upstream of the measurement tube 4 and the like and in the vicinity of the measurement tube 4, a pressure measurement portion 14 is formed (the arrangement is only given by way of example). The pressure gauge 3 is attached to the pressure measurement portion 14 to be housed therein. The pressure measurement portion 14 includes a part for housing the pressure gauge 3 and a part for introducing a part of the fluid to be measured flowing through the flow channel 13. The pressure gauge 3 serves to measure a pressure of the fluid to be measured flowing through the flow channel 13, and a known pressure gauge is used in this case (however, the pressure gauge is compatible with the flow rate converter 11). The pressure gauge 3 is attached to the flow rate converter 11 to be integrated therewith. The pressure gauge 3 is integrated with the flow rate converter 11 at a position slightly away from the vortex detector 6, the temperature sensor 8, and the heating temperature sensor 9 toward the upstream side.

The measurement tube 4 is cylindrically formed to have a rectangular tube cross section (the shape is given only by way of example). The measurement tube 4 is formed to extend in the direction indicated by the arrow in which the fluid to be measured flows. In a part of the measurement tube 4, through which the fluid to be measured flows, the vortex generator 5 and a pressure sensing plate 15 described below, which is positioned at the downstream of the vortex generator 5, are provided. A temperature sensor retaining portion 16 for retaining a tip of the temperature sensor 8 and that of the heating temperature sensor 9 is provided (although the temperature sensor retaining portion is integrally formed in this embodiment, the configuration is not limited thereto). The measurement tube 4 is fixed to the vortex detector 6 through a connecting cylindrical part 17. In this embodiment, the vortex detector 6, to which the measurement tube 4 is connected, is removably mounted to the attached measurement pipe 2.

The vortex generator 5 is a part for generating a vortex in the measurement tube 4, and its shape is set to face the flow of the fluid to be measured. In this embodiment, the vortex generator 5 is formed to have a triangle pole shape (the shape is given only by way of example; several examples are disclosed in Japanese Patent No. 2869054 corresponding to Patent Document 1). The vortex generator 5 is provided for an opening portion of the measurement tube 4, from which the fluid to be measured flows into the measurement tube. The vortex generator 5 is provided to be situated in the center of the opening portion of the measurement tube 4.

The vortexes generated by the vortex generator 5 are now described. The vortexes are separated from a position where a large change in momentum is caused by the flow of the fluid to be measured along the vortex generator 5, which flows into the opening portion of the measurement tube 4. When the cross section of the vortex generator 5 is a triangle as in this embodiment, an edge of the triangle serves as a point of separation. The vortexes separated from the vortex generator 5 to flow out are alternately generated in a zigzag manner according to the Karman's stable vortex condition to flow out while forming vortex streets maintaining a fixed inter-vortex distance and a fixed inter-street distance. The inter-vortex distance is obtained by the number of vortexes generated per unit time, that is, a vortex frequency, and a flow velocity per unit time, which is calculated, for example, based on the flow rate obtained from the fluid having flowed into a reference container such as a reference tank within a predetermined time.

The temperature sensor retaining portion 16 is formed to horizontally protrude from lower walls of the measurement tube 4 (in other words, to protrude from both side walls of the measurement tube 4). Although not particularly limited, the temperature sensor retaining portion 16 is formed to have a triangular shape in plain view. The temperature sensor retaining portion 16 is formed as if the measurement tube 4 is provided with fins. Into the temperature sensor retaining portion 16 as described above, the tip of each of the temperature sensor 8 and the heating temperature sensor 9 is fitted straight.

The vortex detector 6 is a sensor for detecting the vortex, and a pressure sensor is used in this case. The vortex detector 6 includes the pressure sensing plate (sensor pressure sensing plate) 15 provided in the measurement tube 4 at the downstream of the vortex generator 5 and a pressure detection element plate provided inside the vortex detector 6, and is configured to detect a fluctuating pressure (alternating pressure) based on the Karman vortexes generated by the vortex generator 5 with the pressure detection element plate through the pressure sensing plate 15. The vortex detector 6 is attached to be integrated with the flow rate converter 11 in this embodiment.

The vortex type detection device 7 is provided to obtain the flow velocity or the flow rate of the fluid to be measured flowing through the attached measurement pipe 2. The flow velocity or the flow rate of the fluid to be measured flowing through the attached measurement pipe 2 can be obtained by calculating the flow velocity or the flow rate of the fluid to be measured flowing through the measurement tube 4 as a partial flow velocity or a partial flow rate in the attached measurement pipe 2. This is based on the fact that the total flow rate can be estimated as long as the flow is uniform even if the measurement is performed not on the entire cross section of the attached measurement pipe 2 but on a part thereof. Specifically, a flow velocity distribution of a rectified fluid flowing through a straight tube is given as a function of the Reynolds number. Therefore, the flow velocity at a position at a certain distance away from a central portion of the attached measurement pipe 2 can be converted into an average flow velocity in the attached measurement pipe 2.

Known sensors are used as both the temperature sensor 8 and the heating temperature sensor 9 constituting the thermal type detection device 10. A specific description of the configuration is herein omitted. The temperature sensor 8 in this embodiment is a bar-shaped temperature sensor. The heating temperature sensor 9, which is also bar-shaped, is a flow velocity sensor (heater) having the function of a temperature sensor and a function of a heating sensor. In this embodiment, the temperature sensor 8 and the heating temperature sensor 9 are attached to the flow rate converter 11 to be integrated therewith.

The temperature sensor 8 and the heating temperature sensor 9 protrude into the flow channel 13 of the attached measurement pipe 2, and the forefront portions thereof are retained by the temperature sensor retaining portion 16. The respective temperature sensing portions of the temperature sensor 8 and the heating temperature sensor 9 are provided in the vicinity of the measurement tube 4. With the vortex detector 6, the temperature sensor 8 and the heating temperature sensor 9 are arranged in a horizontal row (the arrangement is only given by way of example; another arrangement is possible as long as the vortex detection is not affected). The respective temperature sensing portions of the temperature sensor 8 and the heating temperature sensor 9 may be further increased in length to protrude from the temperature sensor retaining portion 16 toward the center of the flow channel 13 (in order to avoid the effects of heat conducted from outside to the attached measurement pipe 2).

The flow rate converter 11 includes a converter case 18. In the converter case 18, an amplifier board 19 including a configuration such as a microcomputer or the like is provided. A transmission line 20 of the pressure gauge 3, the respective leads of the temperature sensor 8 and the heating temperature sensor 9, and a transmission line 21 of the vortex detector 6 are connected to the amplifier board 19 (the arrangement of the temperature sensor 8 and the heating temperature sensor 9 is illustrated with a modification in FIG. 3 for convenience; the temperature sensor and the heating temperature sensor are arranged at a position rotated by 90 degrees in practice, and the temperature sensor and the heating temperature sensor are arranged with the transmission line 21 of the vortex detector 6 in a direction at a right angle with respect to a paper plane in FIG. 3).

The temperature sensor 8, the heating temperature sensor 9, and the transmission lines 20 and 21 are drawn into the converter case 18. The temperature sensor 8, the heating temperature sensor 9, and the transmission lines 20 and 21 are drawn into the converter case 18 without being exposed to the exterior. The temperature sensor 8, the heating temperature sensor 9, the pressure gauge 3, the vortex detector 6, and the amplifier board 19 have the functions as a flow rate measurement portion and a flow rate computing portion.

On an opening portion of the converter case 18, a converter cover 24 including a switch board 22 and a display board 23 is mounted through a packing (the reference numeral omitted). A transmission cable 25 is connected to one side wall of the converter case 18.

In the above-mentioned configuration and structure, the multi-vortex flowmeter 1 of the present invention allows the selective use of the function of the vortex flowmeter and the function of the thermal flowmeter according to the condition of the flow of the fluid to be measured flowing through the flow channel 13 of the attached measurement pipe 2, specifically, based on a switching point described below. More specifically, the thermal flowmeter is used to perform a measurement in an extremely low flow rate range and a low rate range, whereas the vortex flowmeter is used to perform a measurement in a high flow rate range (the function of the vortex flowmeter is used as much as possible to perform a measurement).

In the multi-vortex flowmeter 1 of the present invention, the high flow rate range measurement using the thermal flowmeter and the low flow rate range measurement using the vortex flowmeter overlap each other to some extent. The switching point is determined in the overlapping range, and then, the switching is performed by the flow rate converter 11 based on the determined switching point (the switching point is described below).

First, an operation for measurement of the extremely low flow rate range or the low flow rate range, specifically, an operation for measurement by using the function of the thermal flowmeter is described. The heating temperature sensor 9 measures a flow rate based on a temperature detected by the temperature sensor 8. Specifically, in the flow rate measurement portion and the flow rate computing portion in the flow rate converter 11, the heating temperature sensor 9 is heated (a current is caused to flow) to set a fixed difference in temperature (for example, +30.degree. C.) between the temperature sensor 8 and the heating temperature sensor 9, and a mass flow rate is calculated from a current value for the heating. After being converted into a predetermined unit, the calculated mass flow rate is displayed on a display portion provided on an upper part of the converter cover 24 or is transmitted through the transmission cable 25 to be displayed on a display device not illustrated.

The additional description of the calculation of the mass flow rate will now be given. When the fluid to be measured (illustration omitted) is caused to flow in the direction indicated by the arrow, the heating temperature sensor 9 is cooled by the fluid to be measured. In order to control the difference in temperature with the temperature sensor 8 to a fixed value, it is necessary to cause a further current to flow through the heating temperature sensor 9. It is known that the current flowing through the heating temperature sensor 9 is proportional to the mass flow rate at this time, and the mass flow rate is calculated by using this fact.

Next, an operation for the measurement by using the function of the vortex flowmeter is described. A fluctuation pressure (alternating pressure) based on the Karman vortexes generated by the vortex generator 5 is detected by the pressure sensing plate 15 and the pressure detection element plate. Then, the flow velocity or the flow rate of the fluid to be measured flowing through the measurement tube 4 is calculated from a detection value obtained by the vortex detector 6 as a partial flow velocity or a partial flow rate in the attached measurement pipe 2 to calculate the flow velocity or the flow rate (volume flow rate) of the fluid to be measured flowing through the attached measurement pipe 2. After being converted into a predetermined unit, the calculated flow velocity or flow rate is displayed on the display portion provided in the upper part of the converter cover 24 or is transmitted through the transmission cable 25 to be displayed on the display device not illustrated.

For the switching between the functions of the flowmeters performed in the flow rate converter 11, a measurement value from the pressure gauge 3 is loaded into the flow rate converter 11. After the switching point is determined in consideration of the loaded measurement value, the switching from the function of the thermal flowmeter to the function of the vortex flowmeter or from the function of the vortex flowmeter to the function of the thermal flowmeter is performed.

The switching point is described.

A vortex differential pressure $\Delta P$ has the following relation.

$$\Delta P = K^* \rho^* V^2$$

The formula is transformed into:

$$V^2 = \Delta P/(K^*\rho) \quad (1)$$

where V: a flow velocity;
$\Delta P$: the vortex differential pressure;
$\rho$: a density; and
K: a constant.

<Switching Point Calculation 1>

The switching is performed based on the mass flow rate (in the case where the pressure alone is a variable).

A mass flow rate Qm has the relation:

$$Qm = \Pi^* R^2 V^* \rho \quad (2)$$

where Qm: the mass flow rate; and
R: a radius of the flow channel 13, whereas the density $\rho$ has the relation:

$$\rho = \rho 0^* P/P0 \quad (3)$$

$\rho 0$: a density at 0° C. and 1 atm;
P: an absolute pressure [Mpaabs]; and
P0: a pressure at 1 atm.≈0.10133 [Mpaabs].
By substituting Formula (2) into Formula (1), $$\{Qm/(\Pi^* R^2{}^*\rho)\}^2 = \Delta P/(K^*\rho)$$

is given.

By rearranging the left-hand side to obtain Qm, $$Qm = \Pi^* R^2{}^*\rho^*\sqrt{\{\Delta P/(K^*\rho)\}}$$

is given.

This formula is rewritten as:

$$Qm = \Pi^* R^2{}^*\sqrt{(\Delta P^*\rho/K)} \quad (4)$$

By substituting Formula (3) into Formula (4), $$Qm = \Pi^* R^2{}^*\sqrt{(\Delta P^*\rho 0^* P/P0/K)}$$

is obtained.

By further rearranging the formula, $$Qm = \Pi^* R^2{}^*\sqrt{(\Delta P^*\rho 0/P0/K)}^*\sqrt{P} \quad (5)$$

is obtained.

Now let:

$$K3 = \Pi^* R^2{}^*\sqrt{(\Delta P^*\rho 0/P0/K)}$$

Then, Formula (5) is rewritten as:

$$Qm = K3^*\sqrt{P} \quad (6)$$

The obtained function gives the switching point (mass flow rate Qm at the switching point).

<Switching Point Calculation 2>

The switching is performed based on the mass flow rate (when the pressure and the temperature are variables). As described above, the mass flow rate Qm has the relation:

$$Qm = \Pi^* R^2{}^*\sqrt{(\Delta P^*\rho/K)} \quad (4)$$

The density $\rho$ has the relation:

$$\rho = \rho 0^* P/P0^* T0/T \quad (7)$$

where T: the absolute temperature [K]; and
T0: an absolute temperature corresponding to 0° C.≈273.15[K]

By substituting Formula (7) into Formula (4), $$Qm = \Pi^* R^2{}^*\sqrt{(\Delta P^*\rho 0/P0^* T0/T/K)}$$

is obtained.

By further rearranging the above Formula, $$Qm = \Pi^* R^2{}^*\sqrt{(\Delta P^*\rho 0/P0^* T0/K)}^*\sqrt{(P/T)} \quad (8)$$

is given.

Now let:

$$K4 = \Pi^* R^2{}^*\sqrt{(\Delta P^*\rho 0/P0^* T0/K)}$$

Then, Formula (8) is rewritten as:

$$Qm = K4^*\sqrt{(P/T)} \quad (9)$$

The obtained function gives the switching point (mass flow rate Qm at the switching point).

In FIG. 4, on a graph showing the mass flow rate [NL/min] on an axis of ordinate (indicated by a normal flow rate unit (a reference value of the temperature and that of the pressure are 0° C. and 1 atm)) and the pressure [Mpaabs] on an axis of abscissa, each of lines of the switching point (thick solid line: upward curve), the minimum flow rate of the vortex flowmeter (alternate long and short dash line: upward curve), and the maximum flow rate of the thermal flowmeter (broken line: straight line parallel to the axis of abscissa) is plotted. The switching point (thick solid line) shown in FIG. 4 is larger than the minimum flow rate of the vortex flowmeter (alternate long and short dash line) and smaller than the maximum flow rate of the thermal flowmeter (broken line). According to the present invention, however, the switching point (thick solid line) is determined in the vicinity of the minimum flow rate of the vortex flowmeter (alternate long and short dash line) to be along therewith by the calculation of the switching point described above. Therefore, as can be seen from the graph, such a switching point (thick solid line) enables the measurement of the flow rate by using the function of the vortex flowmeter as much as possible in the present invention.

The description is now given for comparison referring to FIG. 5. In the graph of FIG. 5, the switching point (thick solid line) is fixed. The switching point (thick solid line) is required to be larger than the minimum flow rate of the vortex flowmeter (alternate long and short dash line) and smaller than the maximum flow rate of the thermal flowmeter (broken line). Therefore, the switching point is determined to be straight in the vicinity of the maximum flow rate of the thermal flowmeter (broken line) to be along therewith. Thus, the measurement must be performed with the thermal flowmeter even when the measurement is possible with the vortex flowmeter. Since the thermal flowmeter is generally known as being inferior to the vortex flowmeter in accuracy, for fixing the switching point (thick solid line), the accuracy is affected to no small extent. The present invention solves this problem.

As described above referring to FIGS. 1 to 5, according to the present invention, the multi-vortex flowmeter 1 with good accuracy, which makes use of the advantage of the vortex flowmeter, can be provided. In other words, the multi-vortex flowmeter 1 better than the conventional ones can be provided.

As the pressure increases, the vortex differential pressure becomes higher. As a result, the sensitivity of the vortex flowmeter is enhanced. Therefore, in consideration of the pressure or of the pressure and the temperature, a lower flow rate can be measured. At this time, the switching point of the present invention is useful. By determining the switching point as in the present invention, the switching between the flowmeters can be performed at the optimal (lowest possible) flowrate (flow velocity) even when the pressure or the temperature fluctuates.

<Switching Point Calculation 3>

The switching is performed based on the volume flow rate (when the pressure alone is a variable).

A volume flow rate Q has the relation:

$$Q=\Pi *R^2*V \qquad (10)$$

where Q: the volume flow rate; and
R: the radius of the flow channel 13, whereas the density p has the relation:

$$\rho=\rho 0*P/P0 \qquad (11)$$

where $\rho 0$: the density at 0° C. and 1 atm;
P: the absolute pressure [Mpaabs]; and
P0: the pressure at 1 atm$\approx$0.10133 [Mpaabs].
By substituting Formula (10) into Formula (1), $$\{Q/(\Pi *R^2)\}^2=\Delta P/(K*\rho)$$

is given.
Rearranging the left-hand side to obtain Q gives:

$$Q=\Pi *R^2*\sqrt{\{\Delta P/(K*\rho)\}} \qquad (12)$$

By substituting Formula (11) into Formula (12), $$Q=\Pi *R^2*\sqrt{\{\Delta P/(K*\rho 0*P/P0)\}}$$

is given.

By further rearranging the formula, $$Q=\Pi *R^2*\sqrt{(\Delta P/K/P0*P0)}/\sqrt{P} \qquad (13)$$

is obtained.
Now let:

$$K1=\Pi *R^2*\sqrt{(\Delta P/K/P0*P0)}$$

Then, Formula (13) is rewritten as:

$$Q=K1/\sqrt{P}$$

The obtained function gives the switching point (volume flow rate Q at the switching point).

<Switching Point Calculation 4>

The switching is performed based on the volume flow rate (when the pressure and the temperature are variables). As described above, the volume flow rate Q has the relation:

$$Q=\Pi *R^2\sqrt{\{\Delta P/(K*\rho)\}} \qquad (12)$$

The density $\rho$ has the relation:

$$\rho=\rho 0*P/P0*T0/T \qquad (14)$$

where T: the absolute temperature [K]; and
T0: the absolute temperature corresponding to 0° C.$\approx$273.15[K]
By substituting Formula (14) into Formula (12), $$Q=\Pi *R^2*\sqrt{\{\Delta P/K*\rho 0*P/P0*T0/T\}}$$

is given.
By further rearranging the above formula, $$Q=\Pi *R^2*\sqrt{(\Delta P/K/\rho 0*P0/T0)/(P/T)} \qquad (15)$$

is obtained.
Now let:

$$K2=\Pi *R^2*\sqrt{(\Delta P/K/\rho 0*P0/T0)}$$

Then, Formula (15) is rewritten as:

$$Q=K2/\sqrt{(P/T)}$$

The obtained function provides the switching point (volume flow rate Q at the switching point).

In FIG. 6, on a graph showing the volume flow rate [L/min] on an axis of ordinate and the pressure [Mpaabs] on an axis of abscissa, each of the lines of the switching point (thick solid line: extremely gentle downward curve), the minimum flow rate of the vortex flowmeter (alternate long and short dash line: extremely gentle downward curve), and the maximum flow rate of the thermal flowmeter (broken line: downward curve) is plotted. The switching point (thick solid line) shown in FIG. 4 is larger than the minimum flow rate of the vortex flowmeter (alternate long and short dash line) and smaller than the maximum flow rate of the thermal flowmeter (broken line). According to the present invention, however, the switching point (thick solid line) is determined in the vicinity of the minimum flow rate of the vortex flowmeter (alternate long and short dash line) to be along therewith by the calculation of the switching point described above. Therefore, as can be seen from the graph, such a switching point (thick solid line) enables the measurement of the flow rate by using the function of the vortex flowmeter as much as possible in the present invention. Moreover, by bringing the maximum flow rate of the thermal flowmeter (broken line) closer to the minimum flow rate of the vortex flowmeter (alternate long and short dash line) as compared with the conventional case, the thermal flowmeter with good accuracy can be used.

As described above referring to FIGS. 1 to 3 and FIG. 6, according to the present invention, the thermal flowmeter at better accuracy than the conventional ones can be used by revising the switching point. As a result, the multi-vortex flowmeter 1 remarkably superior to the conventional ones can be provided.

According to the present invention, the optimal switching of the flowmeters can be performed even if the pressure or the temperature fluctuates.

Besides, it is apparent that various modifications are possible without changing the scope of the present invention.

The invention claimed is:

1. A multi-vortex flowmeter using a mass flow rate for determining a switching point, comprising:
    a vortex flowmeter for measurement of a volume flow rate; and
    a thermal flowmeter for measurement of the mass flow rate to selectively use the vortex flowmeter and the thermal flowmeter based on a flow rate of a fluid to be measured flowing through a flow channel,
    wherein the switching point between the vortex flowmeter and the thermal flowmeter is based on the mass flow rate, and a mass flow rate Qm at the switching point in a range larger than a minimum flow rate of the vortex flowmeter and smaller than a maximum flow rate of the thermal flowmeter is determined by: $Qm=K3*\sqrt{P}$ (where P is a pressure of the flow channel (variable), K3 is a constant determined by an area of the flow channel, a vortex differential pressure, a constant related to the vortex differential pressure, a density at 0° C. and 1 atm, and a pressure at 1 atm).

2. A multi-vortex flowmeter using a mass flow rate for determining a switching point, comprising:
    a vortex flowmeter for measurement of a volume flow rate; and
    a thermal flowmeter for measurement of the mass flow rate to selectively use the vortex flowmeter and the thermal flowmeter based on a flow rate of a fluid to be measured flowing through a flow channel,
    wherein the switching point between the vortex flowmeter and the thermal flowmeter is based on the mass flow rate, and a mass flow rate Qm at the switching point in a range larger than a minimum flow rate of the vortex flowmeter and smaller than a maximum flow rate of the thermal flowmeter is determined by: $Qm=K4*\sqrt{(P/T)}$ (where P is a pressure of the flow channel (variable), T is an absolute temperature of the fluid to be measured (variable), K4 is a constant determined by an area of the flow channel, a vortex differential pressure, a constant related to the vortex differential pressure, a density at 0° C. and 1 atm, a pressure at 1 atm, and an absolute temperature corresponding to 0° C. (273.15K)).

3. A multi-vortex flowmeter using a volume flow rate for determining a switching point, comprising:
    a vortex flowmeter for measurement of a volume flow rate; and
    a thermal flowmeter for measurement of the mass flow rate to selectively use the vortex flowmeter and the thermal flowmeter based on a flow rate of a fluid to be measured flowing through a flow channel,
    wherein the switching point between the vortex flowmeter and the thermal flowmeter is based on the volume flow rate, and a volume flow rate Q at the switching point in a range larger than a minimum flow rate of the vortex flowmeter and smaller than a maximum flow rate of the thermal flowmeter is determined by: $Q=K1/\sqrt{P}$ (where P is a pressure of the flow channel (variable), K1 is a constant determined by an area of the flow channel, a vortex differential pressure, a constant related to the vortex differential pressure, a density at 0° C. and 1 atm, and a pressure at 1 atm).

4. A multi-vortex flowmeter using a volume flow rate for determining a switching point, comprising:
    a vortex flowmeter for measurement of a volume flow rate; and
    a thermal flowmeter for measurement of the mass flow rate to selectively use the vortex flowmeter and the thermal flowmeter based on a flow rate of a fluid to be measured flowing through a flow channel,
    wherein the switching point between the vortex flowmeter and the thermal flowmeter is based on the volume flow rate, and a volume flow rate Q at the switching point in a range larger than a minimum flow rate of the vortex flowmeter and smaller than a maximum flow rate of the thermal flowmeter is determined by: $Q=K2/\sqrt{(P/T)}$ (where P is a pressure of the flow channel (variable), T is an absolute temperature of the fluid to be measured (variable), K2 is a constant determined by an area of the flow channel, a vortex differential pressure, a constant related to the vortex differential pressure, a density at 0° C. and 1 atm, a pressure at 1 atm, and an absolute temperature corresponding to 0° C. (273.15K)).

* * * * *